(12) United States Patent
Lu

(10) Patent No.: US 10,592,113 B2
(45) Date of Patent: Mar. 17, 2020

(54) METHOD FOR TRANSFERRING COMMAND FROM HOST TO DEVICE CONTROLLER AND SYSTEM USING THE SAME

(71) Applicant: Storart Technology Co., Ltd., Hsinchu (TW)

(72) Inventor: Cheng Wei Lu, Hsinchu (TW)

(73) Assignee: Storart Technology (Shenzhen) Co., Ltd., Shenzhen (CN)

( * ) Notice: Subject to any disclaimer, the term of this patent is extended or adjusted under 35 U.S.C. 154(b) by 237 days.

(21) Appl. No.: 15/212,529

(22) Filed: Jul. 18, 2016

(65) Prior Publication Data
US 2018/0018090 A1    Jan. 18, 2018

(51) Int. Cl.
    *G06F 3/06* (2006.01)
(52) U.S. Cl.
    CPC ........... *G06F 3/061* (2013.01); *G06F 3/0659* (2013.01); *G06F 3/0679* (2013.01)
(58) Field of Classification Search
    CPC ....... G06F 3/061; G06F 3/0659; G06F 3/0688
    See application file for complete search history.

(56) References Cited

U.S. PATENT DOCUMENTS

| | | | |
|---|---|---|---|
| 9,842,024 B1 * | 12/2017 | David | G06F 11/108 |
| 2011/0231624 A1 | 9/2011 | Fukutomi et al. | |
| 2012/0221926 A1 * | 8/2012 | Blaum | G06F 11/108 |
| | | | 714/770 |
| 2015/0058529 A1 * | 2/2015 | Lin | G06F 3/0604 |
| | | | 711/103 |
| 2016/0259598 A1 * | 9/2016 | Ikeuchi | G06F 3/0604 |
| 2016/0299690 A1 * | 10/2016 | Jung | G06F 3/061 |

OTHER PUBLICATIONS

Intel, NVM Express: Revision 1.1, Oct. 11, 2012 [retrieved from internet Oct. 13, 2017][<URL:http://www.nvmexpress.org/wp-content/uploads/NVM-Express-1_1.pdf>].*
Patterson et al., A Case for Redundant Arrays of Inexpensive Disks (RAID), ACM, vol. 17, No. 3, 1988 [retrieved from internet Oct. 23, 2018][<URL:https://www.cs.cmu.edu/~garth/RAIDpaper/Patterson88.pdf>] (Year: 1988).*
Natarajan, RAID 0, RAID 1, RAID 5, RAID 10 Explained with Diagrams, The Geek Stuff, 2010 [retrieved from internet Oct. 23, 2018][<URL:https://www.thegeekstuff.com/2010/08/raid-levels-tutorial/>] (Year: 2010).*
Office Action of Taiwan Patent Application No. 105125784, dated Dec. 12, 2017.

* cited by examiner

*Primary Examiner* — Daniel D Tsui
*Assistant Examiner* — Nicolas A. Paperno
(74) *Attorney, Agent, or Firm* — Jackson IPG PLLC; Demian K. Jackson

(57) ABSTRACT

A method for transferring a command from a host to a device controller and a system using the method are disclosed. The method includes the steps of: A. determining a segment size; B. dividing a command into a number of sections each having a size the same as the segment size; C. sequentially distributing the sections to n groups; D. changing distributing order to a reverse order or keeping the same distributing order in step C if a cycle of distribution is finished while there are sections left for distributing; E. restructuring the section(s) in each group as a sub-command after all sections are distributed; and F. providing the sub-commands to a device controller synchronously.

15 Claims, 9 Drawing Sheets

Fig. 5

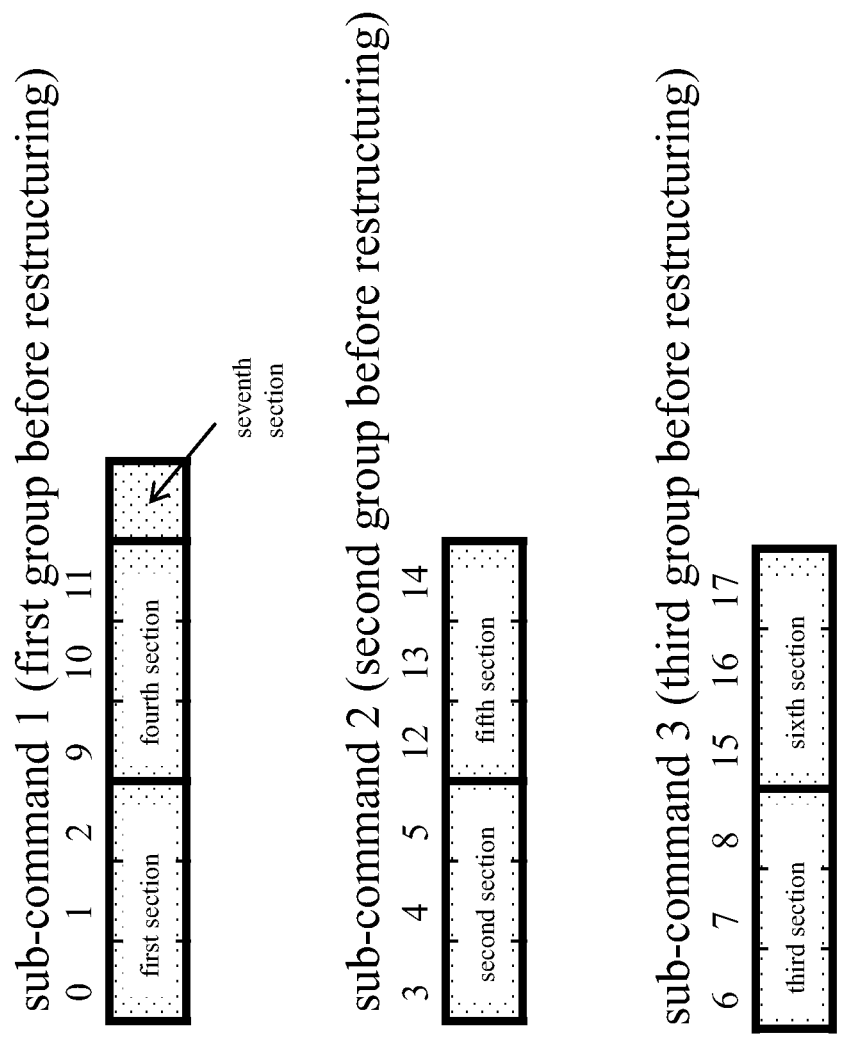

METHOD FOR TRANSFERRING COMMAND FROM HOST TO DEVICE CONTROLLER AND SYSTEM USING THE SAME

FIELD OF THE INVENTION

The present invention relates to a method and a system for transferring a command from a host to a device controller. More particularly, the present invention relates to method and a system for transferring a command from a host to a device controller by dividing the each command into a number of sub-commands.

BACKGROUND OF THE INVENTION

Conventionally, when a host transfers a command to a device, it must be one command per transfer via a transfer interface. With the development of technology of command transfer, a device controller can deal with two or more commands per transfer rather than one. Therefore, a driver of the host can transfer two or more commands to the device controller for processing. It can also divide one command into two or more sub-commands and send them to the device controller. Thus, processing speed for the commands can be faster.

Processes of command transfer can be illustrated by FIG. 1. When the host is boosted or before commands can transferred, the host driver sends an identify command to the device controller via an interface. It is used to identify the information of a storage (HDD (Hard Disk Drive), SSD (Solid State Drive) or memory card) or storages the device controller is managing. The identify command and other commands mentioned later may conform to a bus protocol. For non-volatile-memory-based storages, the bus protocol may be a protocol set forth by a Non Volatile Memory Express (NVME) standard. The NVM Express standard describes a register interface, command set, and feature set for PCI Express-based SSDs. Then, the device controller sends back device information about the storage to the host driver. The device information may include storage unit size, e.g. flash page size, number of block in a SSD, fastest transfer speed, etc. According to the device information, the host driver can provide an address of one command ready to be executed to the device controller. The device controller can read the command from that address and execute it.

As mentioned above, since the driver of the host can divide the command into several (at least two) sub-commands so that the device controller can read the sub-commands from different addresses and execute them in different tasks. It is workable but there is no concrete and feasible method to implement it. The present invention is to disclose a solution for that.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to fulfill the requirement above, a method for transferring a command from a host to a device controller is provided. The method includes the steps of: A. determining a segment size; B. dividing a command into a number of sections each having a size the same as the segment size; C. sequentially distributing the sections to n groups; D. changing distributing order to a reverse order or keeping the same distributing order in step C if a cycle of distribution is finished while there are sections left for distributing; E. restructuring the section(s) in each group as a sub-command after all sections are distributed; and F. providing the sub-commands to a device controller synchronously.

According to the method, the size of the last divided section of a command may be the same as or less than the segment size. The segment size may be the same as a page of a non-volatile memory chip. "n" may be an integer and greater or equal to 2. "n" may also be the maximum number the sub-commands can be fetched and executed by the device controller synchronously. The sub-commands may be provided by sending addresses of the sub-commands in a host to the device controller for fetching. The addresses may be submission queues if a Non Volatile Memory Express (NVME) specification is used for command transfer.

Another aspect of the present invention is about a system using the method. The system includes: a host, installed with a driver, having a memory, for storing commands and sub-commands, wherein the driver is for determining a segment size; dividing a command into a number of sections each having a size the same as the segment size; sequentially distributing the sections to n groups; changing distributing order to a reverse order or keeping the same distributing order if a cycle of distribution is finished while there are sections left for distributing; restructuring the section(s) in each group as a sub-command after all sections are distributed in the memory; and providing the sub-commands synchronously; and a storage device, remotely or locally linked to the host for storing data for accessing, including: a number of Non-Volatile Memory (NVM) chips; and a device controller, linked to the host, for fetch the sub-commands from one command synchronously and executing the sub-commands.

According to the present invention, the size of the last divided section of a command may be the same as or less than the segment size. The segment size may be the same as a page of the non-volatile memory chips. "n" may be an integer and greater or equal to 2. "n" may also be the maximum number the sub-commands can be fetched and executed by the device controller synchronously. The sub-commands may be provided by sending addresses of the sub-commands in the host to the device controller for fetching. The addresses are submission queues if a NVM Express specification is used for command transfer. The device controller and the driver may be set to be synchronous in executing the sub-commands from one command so that the device controller is able to feedback the host after the sub-commands have been executed.

The present invention takes advantages of the smaller size of the sub-commands and synchronously executed tasks in the device controller. Time to execute the sub-commands is shorter than the original command. The overall performance for storage access can be improved. Meanwhile, due to the smaller size of the sub-commands, a DRAM module for temporarily keeping the long original command may be smaller, too. Cost of the storage device can be less.

BRIEF DESCRIPTION OF THE DRAWINGS

FIG. 5 shows how a command is divided.

FIG. 9 shows three formed sub-commands.

DETAILED DESCRIPTION OF THE PREFERRED EMBODIMENTS

The present invention will now be described more specifically with reference to the following embodiments.

Figure 1:
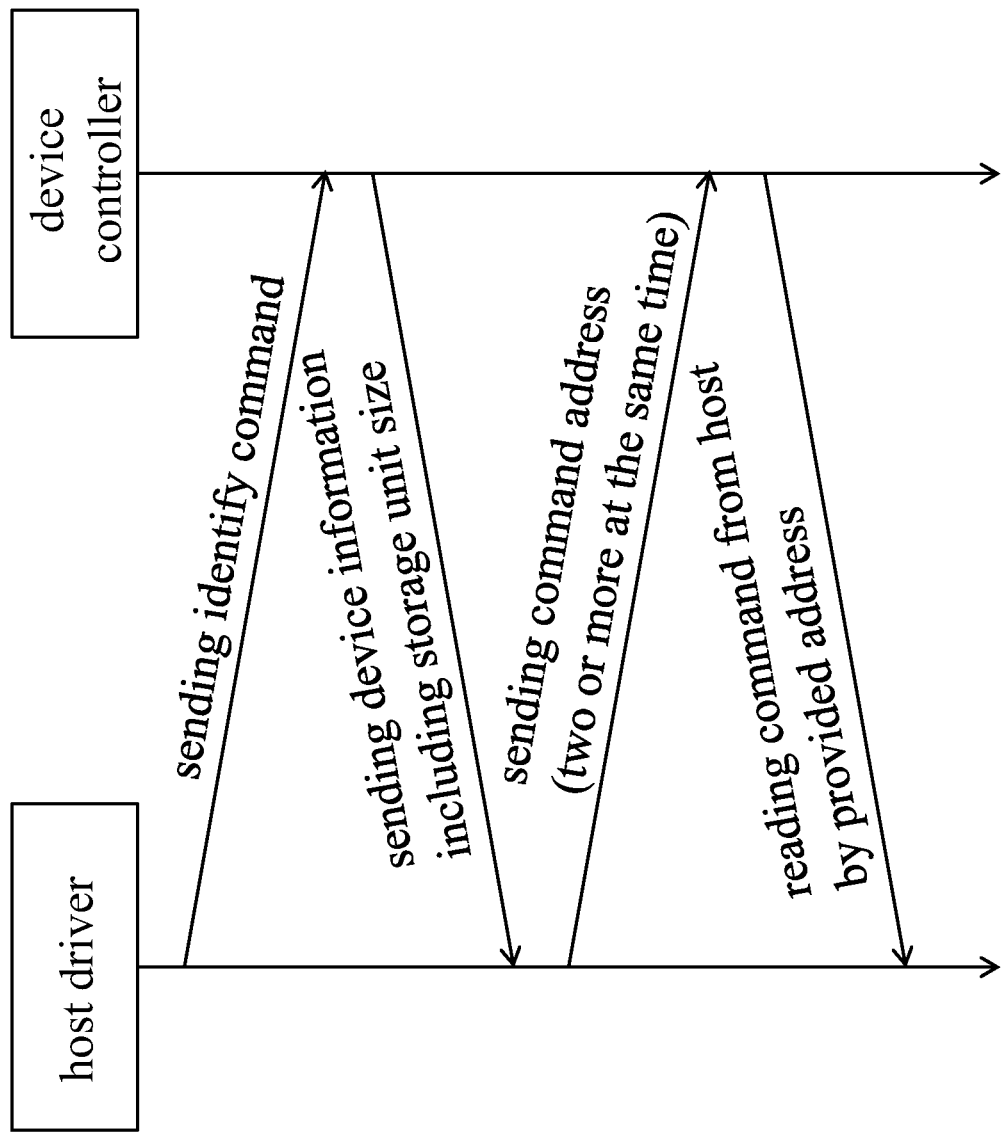
FIG. 1 illustrates a prior art for command transfer.
Figure 2:
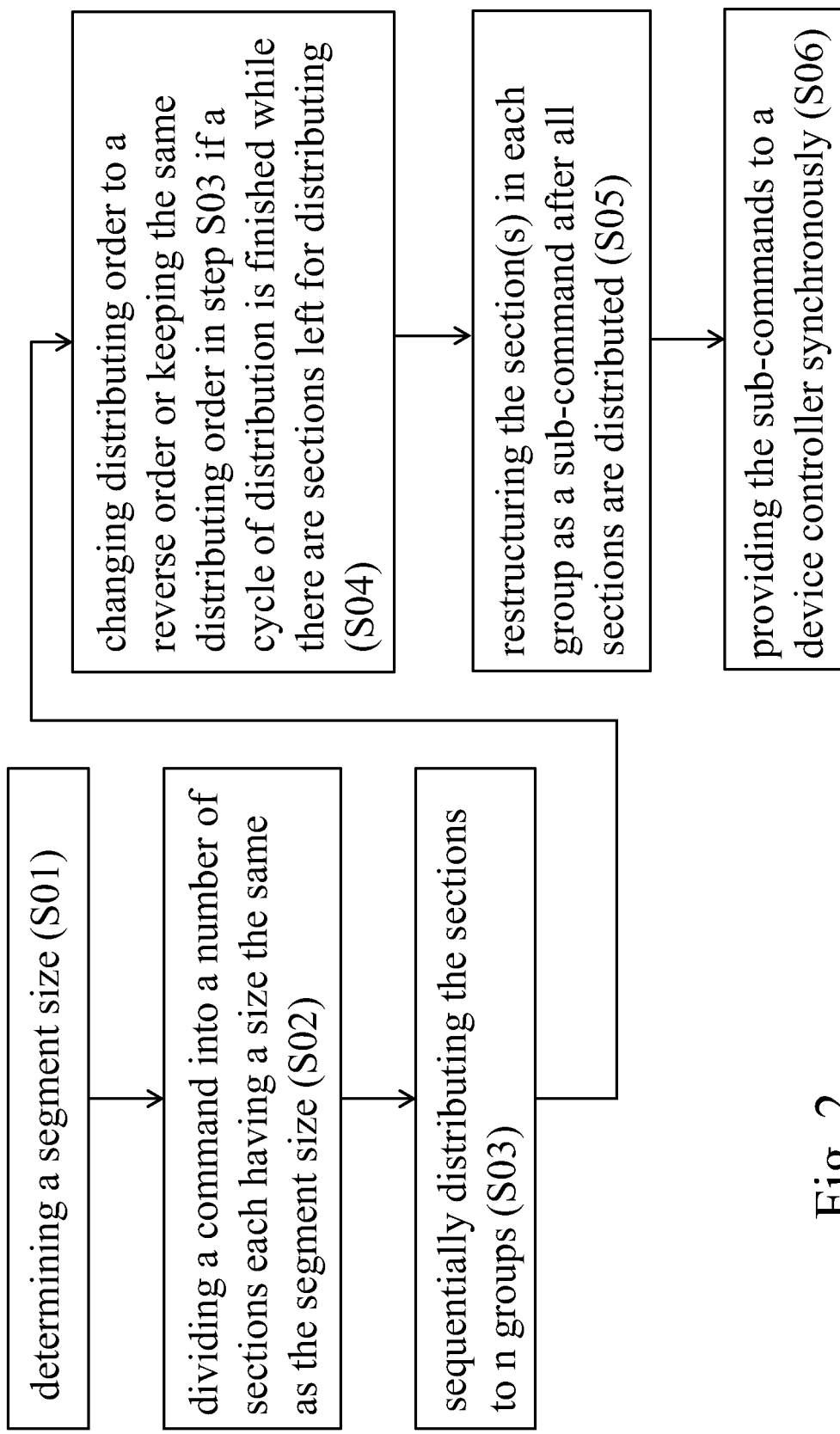
FIG. 2 is a flow chart of a method for transferring a command from a host to a device controller according to the present invention.

Please refer to FIG. 2. FIG. 2 is a flow chart of a method for transferring a command from a host to a device controller according to the present invention. The method can be implemented by a system which has the host and the device controller for executing read and write commands to a storage that the device controller is managing. It should be noticed that the system may refer to a personal computer, a tablet, a smartphone or a standalone electronic device for a specific job, e.g. car computer for controlling the devices of a car. The host and the storage are integrated in one. The system may also have the host and the storage detachably connected. For example, a CPU (Central Processing Unit) in an electronic camera and a memory card the CPU indirectly connected to via a connector. Furthermore, the system mentioned by the present invention may refer to a client computer and a cloud storage (virtual or physical) in a remote data center. Read and write commands can be sent and processed via LAN (Local Area Network) or even Internet. The way to deal with commands transferring for all aspects of applications is unchanged. An embodiment will be illustrated below with a local application.

Figure 3:
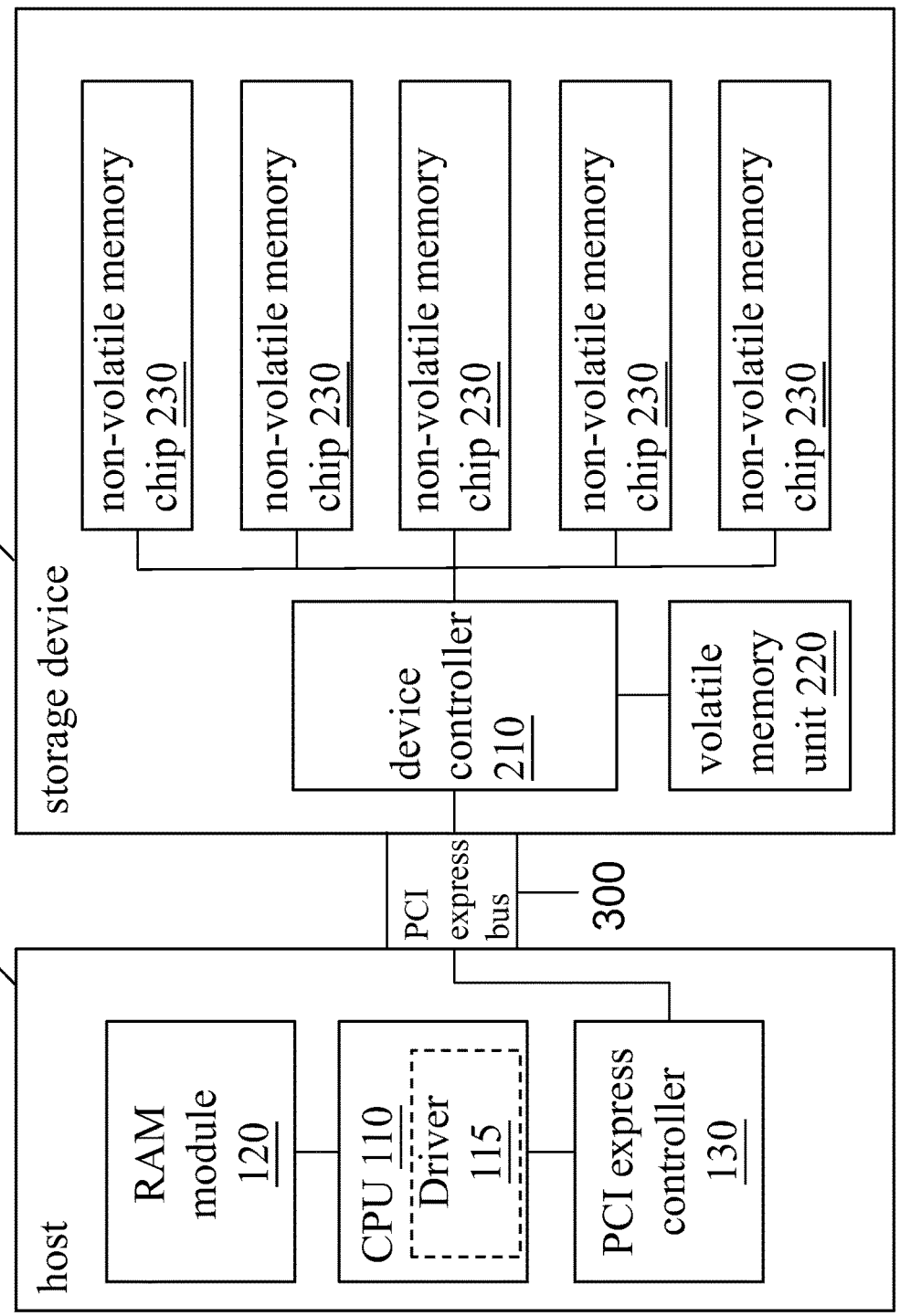
FIG. 3 illustrates a system using the method.

A system 10 has a host 100 and a storage device 200 applying the method disclosed by the present invention is shown in FIG. 3. The host 100 and the storage device 200 are configured in a housing (not shown) and connected via a PCI (Peripheral Component Interconnect) express bus 300. The host 100 has a CPU 110, a RAM module 120 and a PCI express controller 130. It may have other electronic components or devices not in the scope of the present invention. Therefore, no further description for them is illustrated. The host 100 is installed with a driver 115. The driver 115 is initiated after the CPU 100 is powered on for operation. Main functions of the driver 115 include: determining a segment size; dividing a command into a number of sections each having a size the same as the segment size; sequentially distributing the sections to n groups; changing distributing order to a reverse order or keeping the same distributing order if a cycle of distribution is finished while there are sections left for distributing; restructuring the section(s) in each group as a sub-command after all sections are distributed in the memory; and providing the sub-commands synchronously. Details of each function will be illustrated later. The RAM module 120 is used to store commands and sub-commands. The PCI express controller 130 is in charge of communication with a device controller 210 via the PCI express bus 300.

The storage device 200 is locally linked to the host 100 for storing data for accessing in the housing. Of course, as mentioned above, the storage device 200 may remotely linked to the host 100 via Internet in other embodiments. According to the present invention, the storage device 200 should be a non-volatile-memory type storage, such as a SSD (Solid State Disk) or an eMMC. Thus, the storage device 200 may have a number of Non-Volatile Memory (NVM) chips 230 for storing data. In practice, each NVM chip 230 may be a NAND flash memory chip, a NOR flash memory chip, or a charge trap flash memory chip. The storage device 200 also has a volatile memory unit 220, e.g. a DRAM (Dynamic Random Access Memory) module. The volatile memory unit 220 can be used to temporarily keep some important data for executing commands from the host 100. For example, the volatile memory unit 220 may have a mapping table for mapping physical addresses and corresponding logical addresses for accessing. The storage device 200 has the device controller 210. The storage device 200 utilizes the device controller 210 to link to the host 100 via the PCI express bus 300. The device controller 210 can fetch the sub-commands from one command synchronously and executing the sub-commands. Below is an example illustrating how the system 10 is operated by the disclosed method.

It should be emphasized that the method provided by the present invention is implemented by the driver 115 and the device controller 210. If the present invention is commercialized, the driver 115 should be sold along with the device controller 210. Otherwise, the system 10 can not work. According to the method, a first step is to determine a segment size (S01). The segment size is a unit to be divided from a command (read or write). It can be arbitrarily set. For example, 40 k, 512 k or 1024 k. Preferably, the segment size may be the same as a page of the non-volatile memory chips 230. A commonly used page size is 4 k and it is applied to the segment size in this embodiment. The segment size is set by the driver 115.

Figure 5:
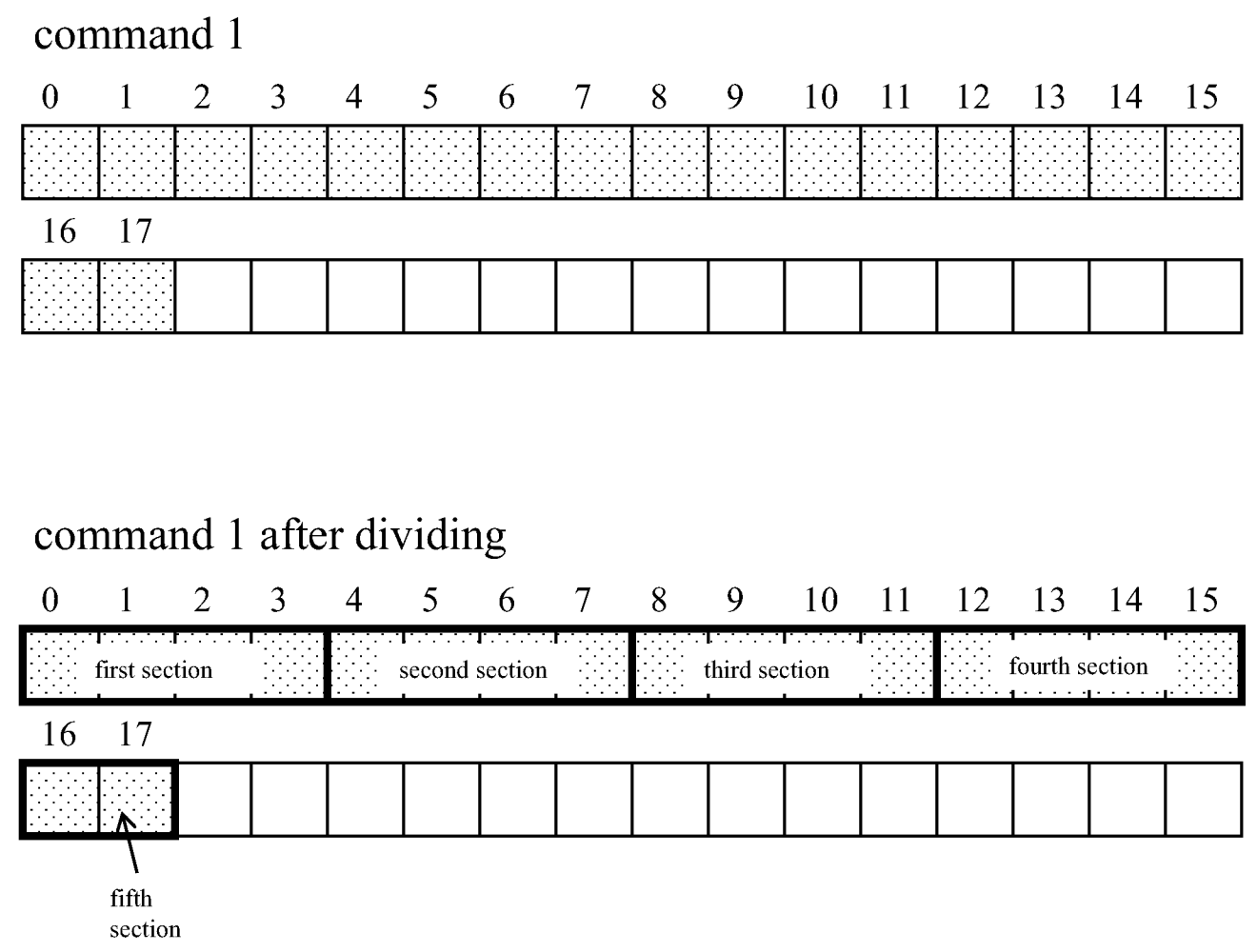

The second step is dividing a command into a number of sections each having a size the same as the segment size (S02). In order to have a better understanding, please see FIG. 5. FIG. 5 shows how a command is divided. A command 1 has a size of 18 k. It occupies addresses in the RAM module 120 from 0 to 17. Since the segment size is 4 k, data in four addresses are divided from the command 1 to form sections. There are a first section (from 0 to 3), a second section (from 4 to 7), a third section (from 8 to 11), a fourth section (from 12 to 15) and a fifth section (from 16 to 17). Step S02 is an ideal situation that the command length is an integer multiple of the segment size. In most of the cases, the size of the last divided section (as the fifth section) of a command may be less than the segment size.

Figure 6:
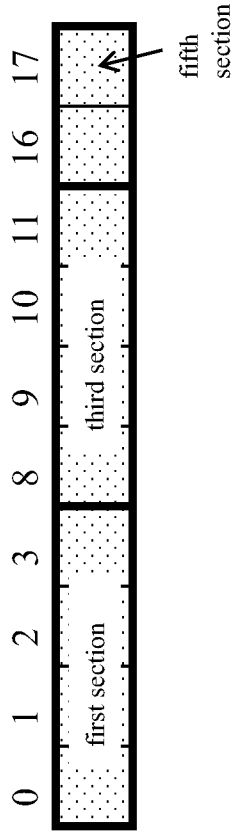
FIG. 6 shows two formed sub-commands.
Figure 6:
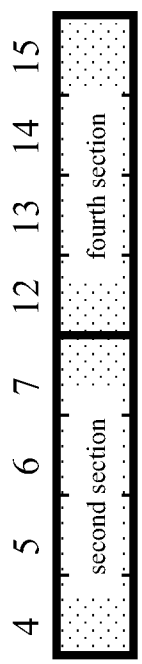
Figure 7:
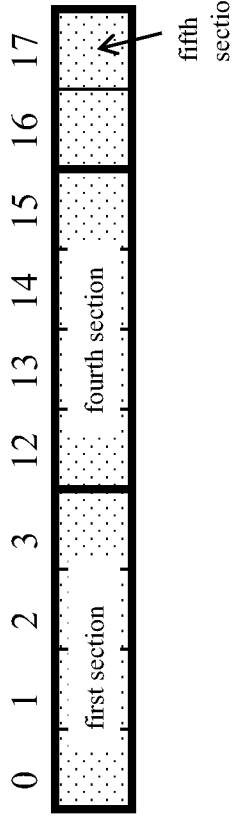
FIG. 7 shows another two formed sub-commands.
Figure 7:
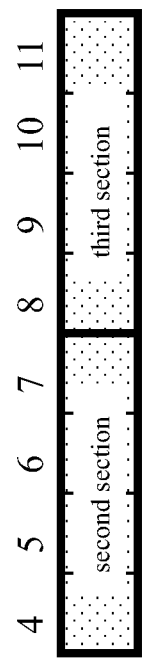

Then, sequentially distributing the sections to n groups (S03). As shown in FIG. 6 which shows the result of distribution, n is set to 2 so that there are two groups. The first section is distributed to the first group and then the second section is distributed to the second group. If a cycle of distribution is finished while there are still sections left for distributing, change distributing order to a reverse order or keep the same distributing order in step S03 (S04). Step S04 deal with all distributions after the first cycle. There are two options according to the present invention. First, the third section is distributed to the first group, the fourth section is distributed to the second group and finally the fifth section is distributed to the first group. The first group has the first section, the third section and the fifth section in sequence. The second group has the second section and the fourth section in sequence. The distributing order is unchanged in the second cycle. Secondly, referring to FIG. 7, the third section is distributed to the second group, following the second section. Then, the fourth section and the fifth section are sequentially distributed to the first group. The first group has the first section, the fourth section and the fifth section in sequence. The second group has the second section and the third section in sequence. The distributing order is changed in the second cycle and starts distribution from the second group first. Thus, the results of two distributions are shown in FIG. 6 and FIG. 7, respectively.

The next step is to restructure the section(s) in each group as a sub-command after all sections are distributed (S05). As shown in FIG. 6 or FIG. 7, the first group shown on the top is restructured to be a sub-command 1 and the second group shown on the bottom is restructured to be a sub-command 2.

Figure 4:
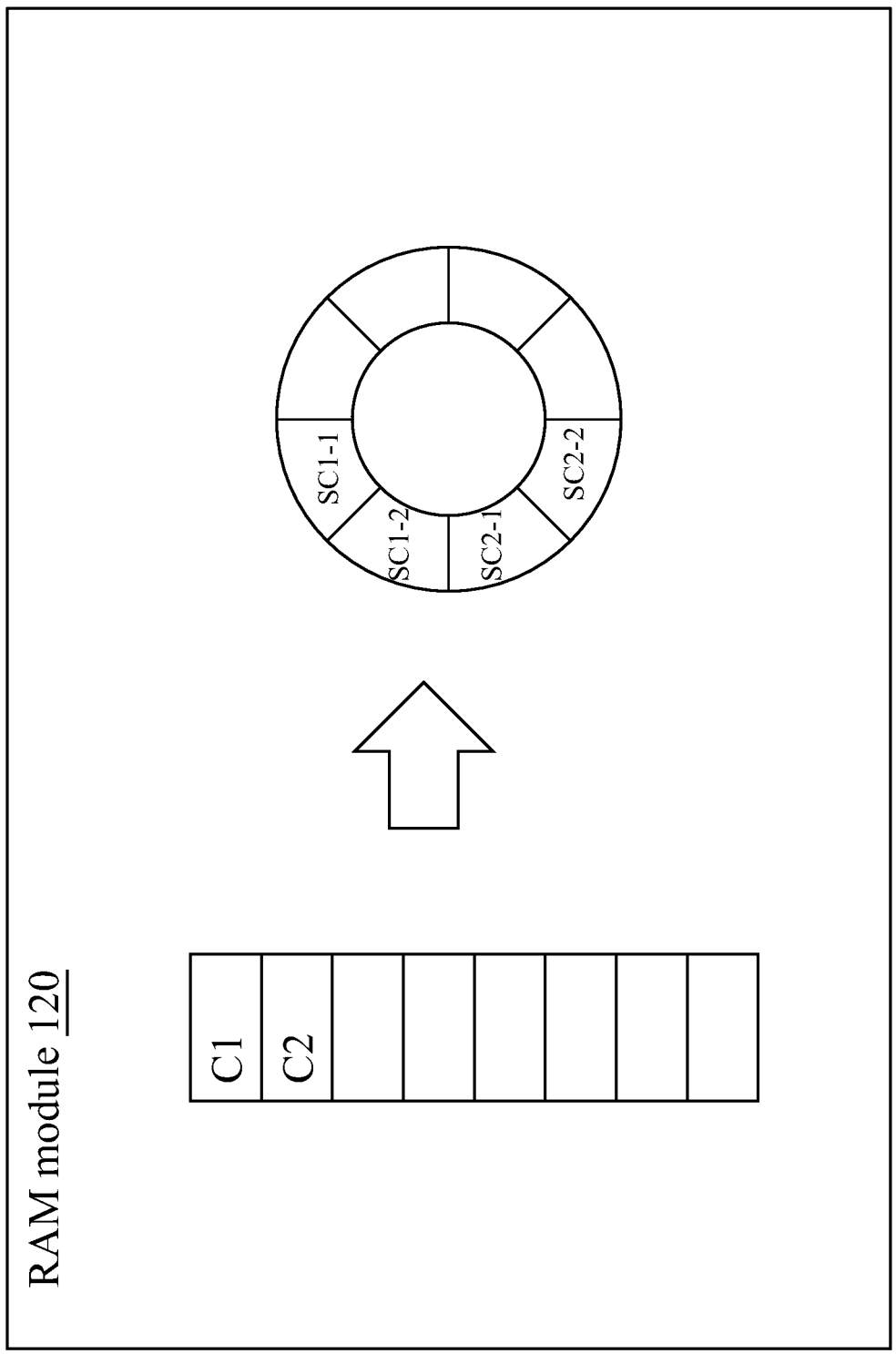
FIG. 4 shows data structure in a RAM module.

A last step of the method is to provide the sub-commands (sub-command 1 and sub-command 2) to the device controller 210 synchronously (S06). It means the sub-command 1 and sub-command 2 should not be fetched by the device controller 210 separately since they belong to one command. The sub-commands should be queued in the RAM module 120. Please see FIG. 4. FIG. 4 shows data structure in the RAM module 120. Two commands C1 and C2 are queued as the CPU 110 originally planned. After processing by the driver 115, the command C1 is divided into sub-commands SC1-1 and SC1-2. The command C2 is divided into sub-commands SC2-1 and SC2-2. Sub-commands SC1-1, SC1-2, SC2-1 and SC2-2 are taken as individual submission queues according to NVM Express specification. Then, the sub-commands are provided by sending addresses of the sub-commands in the host 100 (or say the RAM module 120) to the device controller 210 for fetching. The addresses are the submission queues in this example where the NVM Express specification is used for command transfer.

From step S01 to step S06, all processes can be done by the driver 115. Namely, when the driver 115 runs from step S01 to step S06, all necessary computing are carried out by the CPU 110 and related data are stored in the RAM module 120. The device controller 210 and the driver 115 must be set to be synchronous in executing the sub-commands from one command so that the device controller 210 is able to feedback the host 100 after the sub-commands have been executed. Meanwhile, the segment size and the number n should be the same for the device controller 210 and the driver 115 when operating.

According to the present invention, n is the maximum number the sub-commands can be fetched and executed by the device controller 210 synchronously. If the device controller 210 can deal with two commands synchronously, n is 2; if the device controller 210 can deal with four commands synchronously, n is 4; and so on. At least, n should be an integer and greater or equal to 2. In the present embodiment, n=2 is used. In the following embodiment, an example shows how the method is applied if n is 3.

Figure 8:
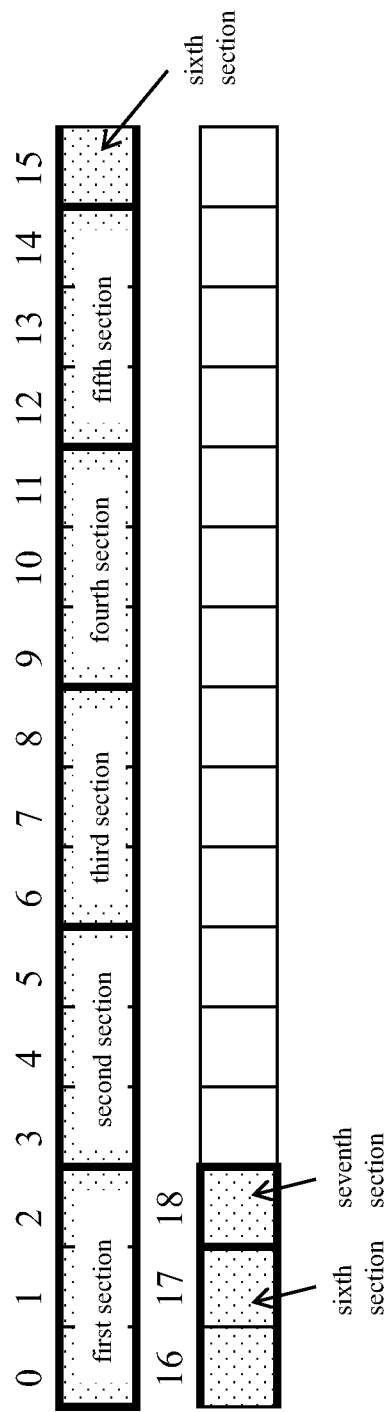
FIG. 8 shows how another command is divided.

Please see FIG. 8 and FIG. 9. FIG. 8 shows a command which is divided for forming three sub-commands. FIG. 9 shows the result of distribution of sections. A command 2 has a size of 19 k. It occupies addresses in the RAM module 120 from 0 to 18. In step S01, the segment size is determined to be 3 k, rather than 4 k in the previous embodiment. Then, in step S02, the command 2 is divided into seven sections: a first section (from 0 to 2), a second section (from 3 to 5), a third section (from 6 to 8), a fourth section (from 9 to 11), a fifth section (from 12 to 14), a sixth section (from 15 to 17) and a seventh section (18). The seventh section is an exception that the last section is smaller than the segment size.

Then, in step S03, the command is distributed sequentially to 3 groups, a first group, a second group and a third group. The first section is distributed to the first group, the second section is distributed to the second group and then the third section is distributed to the third group. After a cycle of distribution is finished, keep the same distributing order in step S03 for all distributions after the first cycle. The fourth section is distributed to the first group, the fifth section is distributed to the second group, the sixth section is distributed to the third group and finally the seventh section is distributed to the first group. The first group has the first section, the fourth section and the seventh section in sequence. The second group has the second section and the fifth section in sequence. The third group has the third section and the sixth section in sequence.

After restructure process of step S05, in FIG. 9, the first group is restructured to be a sub-command, the second group is restructured to be a sub-command 2 and the third group is restructured to be a sub-command 3. The three sub-commands are fetched by the device controller 210. Thus, three tasks may take the three sub-commands synchronously so that the original command can be executed faster this way.

It should be emphasized that although the embodiments above use examples with NVM Express specification, however, in practice, the present invention can be applied to other specifications which allow multiple commands sent and received between the host and the device controller. For example, UFS (Universal Flash Storage) specification.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for transferring a command from a host to a storage device which is remotely or locally linked to the host, comprising the steps of:
    A. determining a segment size of a command to be transferred from the host to the storage device;
    B. dividing the command into a plurality of sections each having a size the same as the segment size by a driver in the host;
    C. sequentially distributing the sections from the driver to a memory in the host which is divided into n groups, wherein each group has more than one section;
    D. changing distributing order to a reverse order or keeping the same distributing order in step C after distributing one section to each of the n groups until there are no sections left for distributing;
    E. combining the sections in each group to form a sub-command after all sections are distributed, wherein each sub-command is taken as an individual submission queue; and
    F. synchronously providing the sub-commands of the command to be transferred from the memory of the host to the storage device which is remotely or locally linked to the host while the command is queued by the storage device.

2. The method according to claim 1, wherein the size of the last divided section of a command is the same as or less than the segment size.

3. The method according to claim 1, wherein the segment size is the same as a page of a non-volatile memory chip.

4. The method according to claim 1, wherein n is an integer and greater or equal to 2.

5. The method according to claim 4, wherein n is the maximum number the sub-commands can be fetched and executed by the device controller synchronously.

6. The method according to claim 1, wherein the sub-commands are provided by sending addresses of the sub-commands in a host to the device controller for fetching.

7. The method according to claim 6, wherein the addresses are submission queues if a Non Volatile Memory Express (NVME) specification is used for command transfer.

8. A system, comprising:
a host, installed with a driver, having a memory, for storing commands and sub-commands, wherein the driver is for determining a segment size of a command to be transferred; dividing the command into a plurality of sections each having a size the same as the segment size; sequentially distributing the sections from the driver to the memory of the host which is divided into n groups, wherein each group has more than one section; changing distributing order to a reverse order or keeping the same distributing order after distributing one section to each of the n groups until there are no sections left for distributing; combining the sections in each group into to form a sub-command after all sections are distributed in the memory, wherein each sub-command is taken as an individual submission queue; and synchronously providing the sub-commands synchronously of the command to be transferred from the memory of the host to a storage device while the command is queued by the storage device; and
the storage device, remotely or locally linked to the host for storing data for accessing, comprising:
a plurality of Non-Volatile Memory (NVM) chips; and
a device controller, linked to the host, for fetching the sub-commands from one command synchronously and executing the sub-commands.

9. The system according to claim 8, wherein the size of the last divided section of a command is the same as or less than the segment size.

10. The system according to claim 8, wherein the segment size is the same as a page of the non-volatile memory chips.

11. The system according to claim 8, wherein n is an integer and greater or equal to 2.

12. The system according to claim 11, wherein n is the maximum number the sub-commands can be fetched and executed by the device controller synchronously.

13. The system according to claim 8, wherein the sub-commands are provided by sending addresses of the sub-commands in the host to the device controller for fetching.

14. The system according to claim 13, wherein the addresses are submission queues if a NVM Express specification is used for command transfer.

15. The system according to claim 8, wherein the device controller and the driver are set to be synchronous in executing the sub-commands from one command so that the device controller is able to feedback the host after the sub-commands have been executed.

* * * * *